United States Patent [19]

Shiraishi et al.

[11] Patent Number: 5,065,357
[45] Date of Patent: Nov. 12, 1991

[54] DATA PROCESSING MACHINE WITH LIQUID CRYSTAL DISPLAY AND CONTROL MEANS FOR REGULATING BACKLIGHTING TO THE DISPLAY

[75] Inventors: Tomikatsu Shiraishi; Isao Kawano, both of Nara, Japan

[73] Assignee: Sharp Kabushiki Kaisha, Osaka, Japan

[21] Appl. No.: 565,179

[22] Filed: Aug. 9, 1990

Related U.S. Application Data

[63] Continuation of Ser. No. 300,182, Jan. 23, 1989, abandoned, which is a continuation of Ser. No. 888,064, Jul. 22, 1986, abandoned.

[30] Foreign Application Priority Data

Jul. 22, 1985 [JP] Japan ............... 60-113579
Jul. 29, 1985 [JP] Japan ............... 60-117724

[51] Int. Cl.$^5$ .............................. G06F 1/32
[52] U.S. Cl. ...................... 395/200; 364/707; 364/948.6; 364/948.8; 364/DIG. 2; 365/227
[58] Field of Search ............... 365/227; 364/707

[56] References Cited

U.S. PATENT DOCUMENTS

| | | | |
|---|---|---|---|
| 3,736,569 | 5/1973 | Bouricius et al. | 364/200 |
| 3,812,489 | 5/1974 | Hirano et al. | 340/756 X |
| 4,293,927 | 10/1981 | Hoshii | 364/900 |
| 4,365,290 | 12/1982 | Nelius et al. | 364/200 |
| 4,381,552 | 4/1983 | Nocilini et al. | 365/227 X |
| 4,562,478 | 12/1985 | Hirasawa et al. | 340/784 X |

OTHER PUBLICATIONS

"Backlite Lights Handheld Multimeter", Electronic Engineering, vol. 56, No. 689, May 1984, pp. 19, 20.
Patent Abstracts of Japan, vol. 8, No. 165 (P-291)(1602), JP-A-59 60 524 (Toshiba K.K.), Apr. 6, 1984.

*Primary Examiner*—Eddie P. Chan

[57] ABSTRACT

A data processing machine which is provided with a liquid crystal display unit having an electroluminescent panel functioning as the backlighting source of the liquid crystal display unit, which includes a circuit for counting the period during which the electroluminescent panel is inoperative and a control circuit that extinguishes the illumination of the electroluminescent panel in response to a signal output from the time-counting circuit. Furthermore, a circuit indicating to the operator that the extinguished illumination of the electroluminescent panel is due to operation of the above controlled circuit can also be provided.

11 Claims, 3 Drawing Sheets

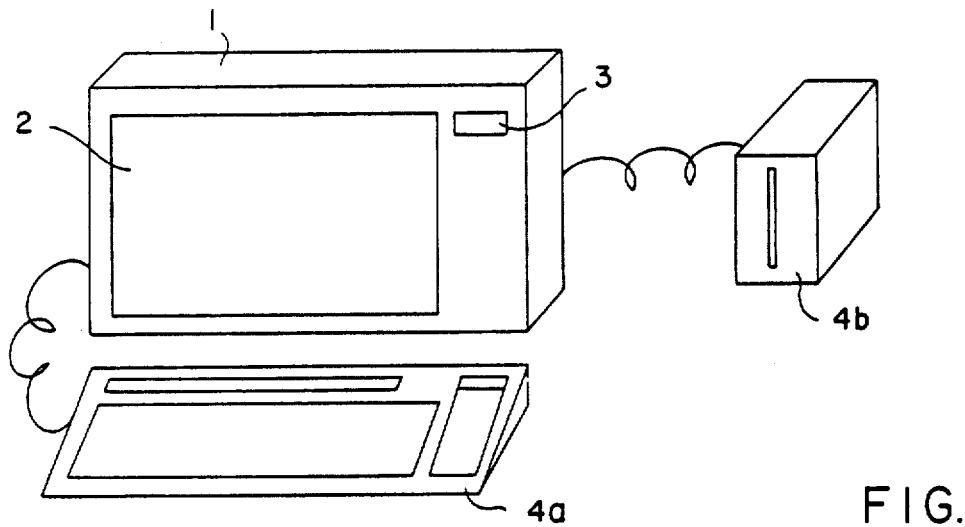
FIG. 1
FIG. 2
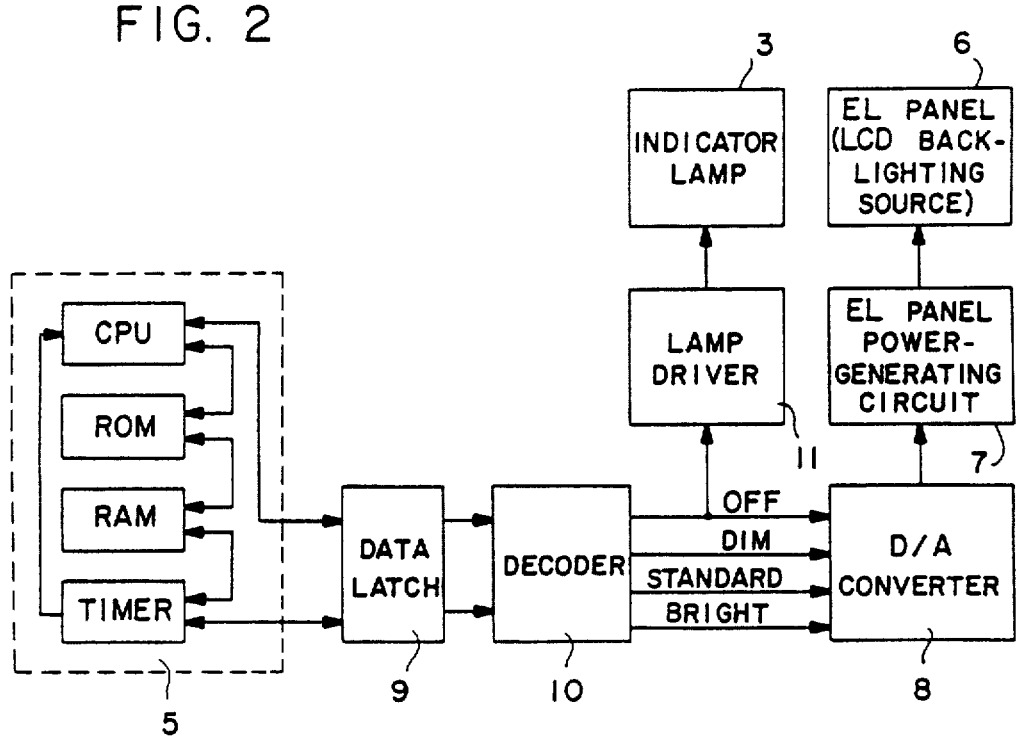

DATA PROCESSING MACHINE WITH LIQUID CRYSTAL DISPLAY AND CONTROL MEANS FOR REGULATING BACKLIGHTING TO THE DISPLAY

This application i a continuation of application Ser. No. 07/300,182 filed on Jan. 23, 1989, now abandoned and which is a continuation of Ser. No. 06/888,064 filed on 7/22/86, now abandoned.

BACKGROUND OF THE INVENTION

The present invention relates to a data processing device which is provided with a liquid crystal display and an electroluminescent panel to provide backlighting. More particularly, it relates to a data processing device which automatically turns off the electroluminescent panel if it is left inoperative for a specific period of time and which is provided with a function to indicate to the operator that the panel light has been extinguished.

Conventionally, permeable liquid crystal display devices are developed to improve visibility. Any conventional data processing device incorporating a liquid crystal display normally is provided with an electroluminescent panel for backlighting, the brightness of which is proportional to the applied voltage and frequency. However, the use of a conventional electroluminescent panel at high levels of brightness shortens its service life (the period of time until the luminosity of the electroluminescence fades by one half).

SUMMARY OF THE INVENTINO

The present invention overcomes the disadvantages mentioned above by providing a novel data processing device which stops the power supply to the electroluminescent panel when the liquid crystal display is left inoperative. This power-saving feature ensures a brighter display and a longer service life for the backlighting panel of liquid crystal displays. Another object of the present invention is to provide a novel data processing device which includes means for indicating to the operator when the controller system has extinguished the electroluminescent panel in line with the function described above. This allows the operator to distinguish between extinguishment by the controller system and unexpected failure of the panel. Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent from the following detailed description to those skilled in the art.

To achieve the above objects, one of the preferred embodiments of the present invention provides a novel data processing device which is provided with a liquid crystal display unit using an electroluminescent panel as a backlighting source comprising means for counting the time period during which the electroluminescent panel is left inoperative and control means for turning off the electroluminescent panel in response to signals output from said counting means.

In addition, according to another preferred embodiment of the present invention, a novel data processing device which incorporates a liquid crystal display unit using an electroluminescent panel as a backlighting source comprises means for counting the time period during which the electroluminescent panel is left inoperative, control means for turning off the electroluminescent panel in response to signals output from said counting means, and means for indicating to the operator that the extinguished electroluminescent panel is due to the operation of the control means.

BRIEF DESCRIPTION OF THE DRAWINGS

The present invention will be better understood from the detailed description given hereinbelow and the accompanying drawings which are given by way of illustration only, and thus are not limitative of the present invention in which:

FIG. 1 is an external view of the data processing device reflecting the preferred embodiments of the present invention;

FIG. 2 is a simplified block diagram of the data processing device shown in FIG. 1;

DESCRIPTION OF THE PREFERRED EMBODIMENTS

Figure 3A:
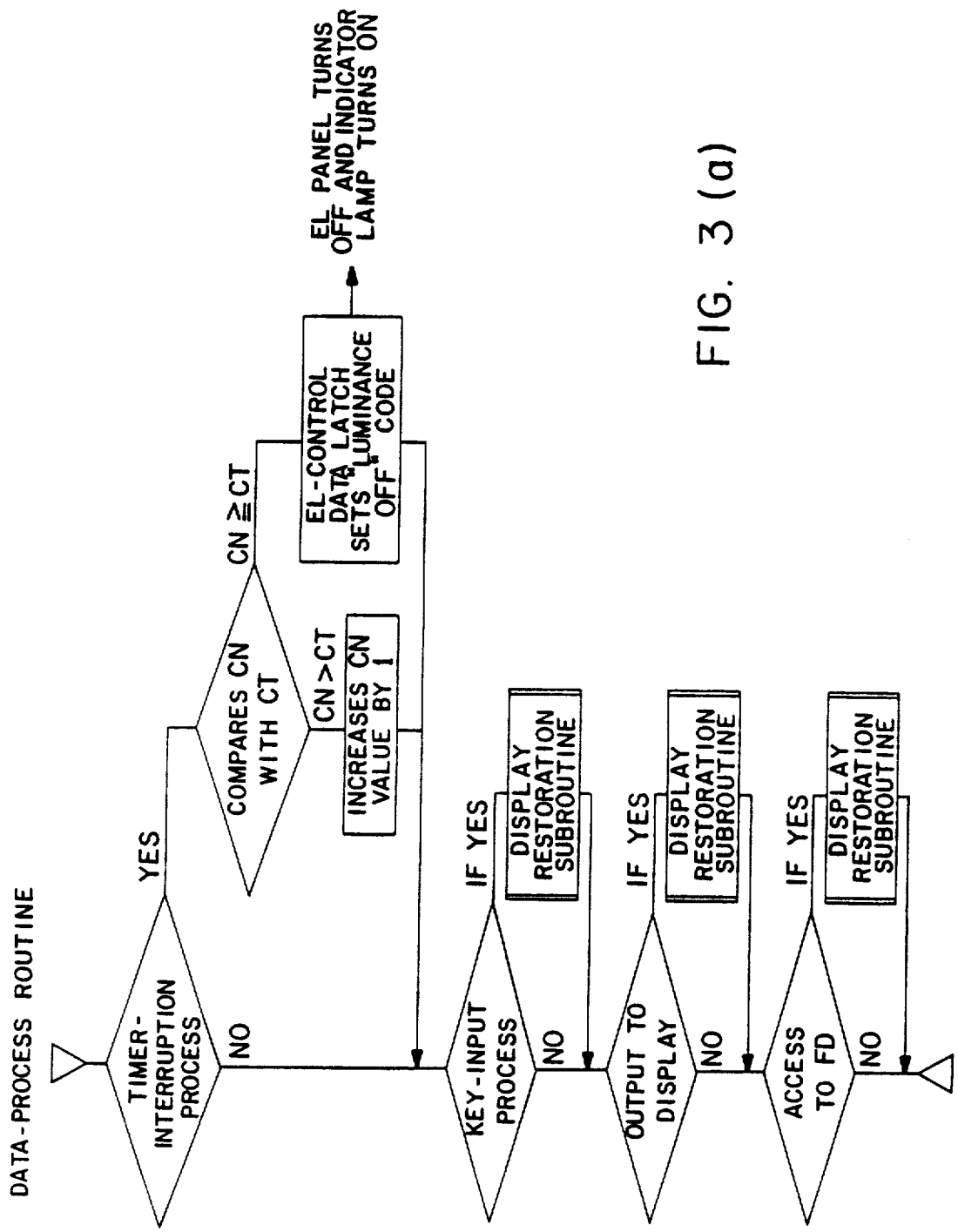
FIGS. 3(a) and 3(b) are operational flowcharts denoting sequential processes executed by the data processing device related to the present invention.

Referring now to the accompanying drawings, the configurations of the data processing device related to the present invention is described below. According to one of the preferred embodiments of the invention, the controller unit first counts the time during which the electroluminescent backlighting panel of the liquid crystal display unit is inoperative.

If the electroluminescent panel is left inoperative for more than a specific period of time, electroluminescent panel is in an inoperative stage. The controller system will then turn off the power supply to the electroluminescent panel. According to another preferred embodiment, simultaneous with the discontinued power supply to the electroluminescent panel, the controller system lights an indicator lamp located near the liquid crystal display. The controller system recognizes that the electroluminescent panel is inoperative when the processes for displaying the picture on the liquid crystal display, for inputting data via a keyboard operation, and for accessing data from a memory such as a floppy disc are inactive. FIG. 1 is external view of the data processing device reflecting the preferred embodiments of the present invention. In FIG. 1, a displaying device consisting of a liquid crystal display unit 2 is provided in front of a data processing device 1. Since the display elements of the liquid crystal display unit 2 cannot illuminate themselves, an electroluminescent panel on the back of the liquid crystal display unit 2 is provided for backlighting. As a result, while no data is being displayed, the luminosity of the electroluminescent panel can be observed easily across the entire surface of the display. An indicator lamp 3 on the side of the liquid crystal display unit 2 informs the operator when the electroluminescent panel is extinguished during operation of the data processing device 1. A keyboard 4a enables input of data and control commands into the data processing device 1. Since the keyboard 4a constructed like conventional computers, no further explanation is necessary. A floppy disc 4b is connected electrically to the data processing device 1 to allow a variety of data to be either written into it or read out of it.

FIG. 2 is a simplified block diagram depicting the configuration of the electroluminescent panel driving unit.

A controller system 5 is comprised of a central processing unit (CPU), a read-only memory (ROM), a random access memory (RAM), and a TIMER. The ROM stores a variety of system programs. A power-generating circuit 7 feeds power to an electroluminescent panel 6 to illuminate the panel surface and thereby supply backlighting for the liquid crystal display unit. The luminosity of this electroluminescent panel 6 varies in accordance with the applied AC voltage. The electroluminescent panel 6 related to the present invention is provided with four levels of luminosity, about 8.5 V, 6 V, 5 V, and 0 V (when off). In response to a signal from a digital-analogue (D/A) converter 8, the power-generating circuit 7 applys one of these voltages to the electroluminescent panel 6. The desired degree of luminosity can be designated when the data processing device begins operation. A 2-bit code is generated in accordance with the luminosity level designated by the operator and latched by a data-latch circuit 9. The 2-bit codes are as follows:

| 2-bit codes | Luminosity level |
|---|---|
| 00 | OFF |
| 01 | Dark |
| 10 | Standard |
| 11 | Bright |

These 2-bit codes are decoded by a decoder 10 to allow the D/A converter 8 to be activated for proper selection of the voltage level corresponding to the designated 2-bit code. The TIMER of the controller system 5 automatically generates a "luminance-OFF" code (00) to turn off the electroluminescent panel 6. The decoder 10 outputs the luminance-OFF code (00). As soon as the electroluminescent panel 6 turns off, the luminance-OFF code (00) activates a lamp driver 11 to light up a indicator lamp 3.

Figure 3B:
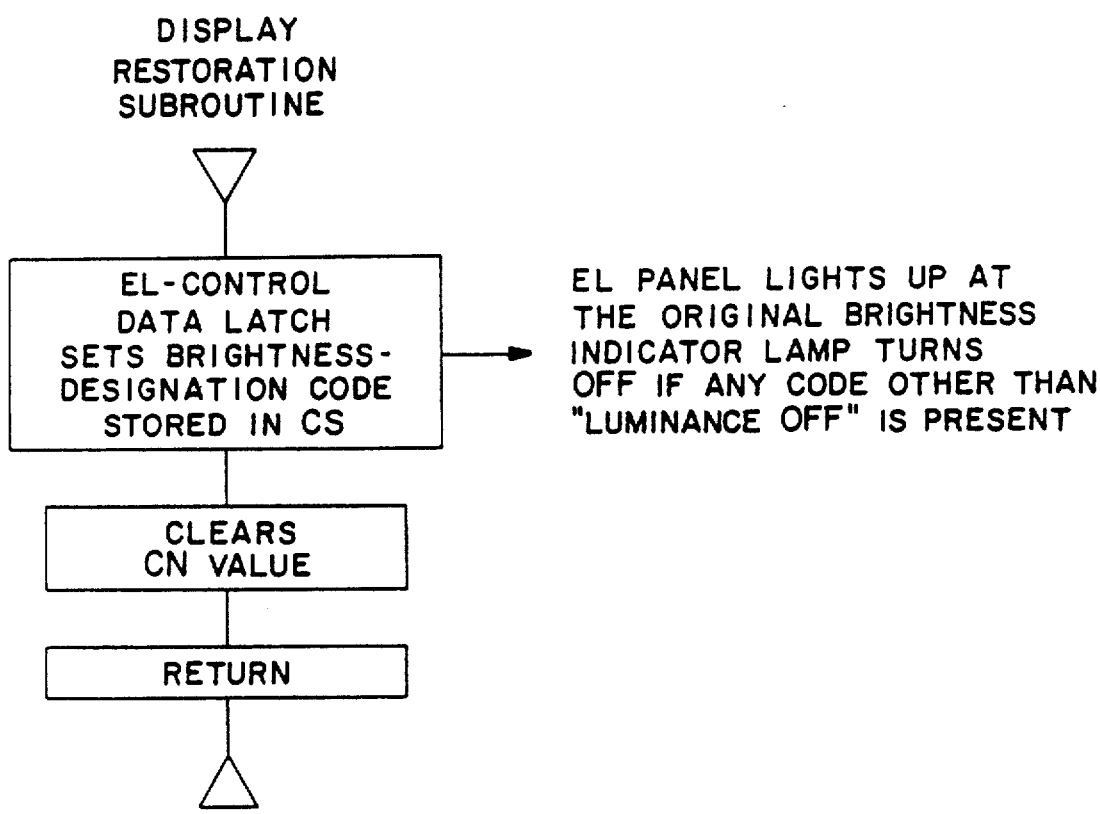

Referring now to FIG. 3, operation of the data processing device related to the present invention is described below. The random access memory (RAM) contains three operation control registers: a register CS which stores data related to the designated brightness of the electroluminescent panel 6; a register CT which stores data related to the panel-light extinguishing time period that has set; and a register CN which stores data related to the elapsed time. The value of the registers CS and CT can be rewritten freely either by key operation performed by the user or by program execution. The operation flowchart shown in FIG. 3(a) describes the main process routine, while the operation flowchart shown in FIG. 3(b) denotes the subroutines needed to restore the display By activating both routines, the CPU measures the time elapsed by counting the number of timer interruptions generated at specific intervals. (The timer-interruption process is executed as soon as the timer has counted a predetermined time, for example, 1 second, while the system processes the designated data.) Then the controller system sequentially stores the elapsed time into the register CN until the timer has entered the designated time period. (The elapsed time is counted in milliseconds, seconds, or minutes, depending on the system's constitution.) Finally, the controller system compares the value stored in the register CN with the value entered by the operator into the register CT. If the value stored in the register CN is greater than or equal to the value stored in the register CT (CN≧CT), the controller system recognizes that the predetermined time period has elapsed and sets the luminance-OFF code "00" in the data latch circuit 9. This causes the electroluminescent panel 6 illumination to shut off, while the indicator lamp 8 simultaneously lights up. If the user inputs data via the keyboard, displays data, or accesses a floppy disc while the time counting is underway, the controller system may first clear the value in the register CN and then measure the time during which the entire system is inoperative (the state in which any of the operations is initiated by the user).

If the operator executes one of the above operations after the display system has been turned off automatically by the controller system and the display system has been inoperative for more than the predetermined period of time, the controller system identifies that the operation has resumed, and causes the electroluminescent panel 6 to restore the original brightness in accordance with the value stored in the register CS. Simultaneously, the controller system clears the value of the register CN to allow the timer to begin counting the elapsed time of inoperation.

Figure 4:
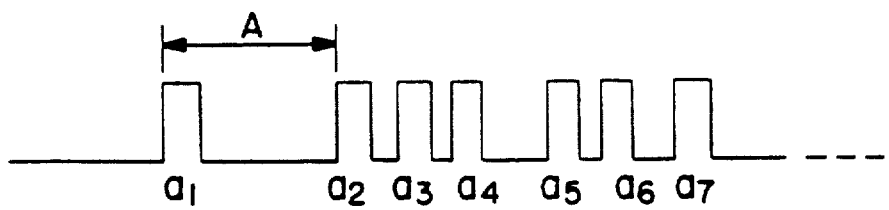
FIG. 4 shows the waveforms used to explain operations of the data processing device related to the present invention.

If the operator uses the keyboard to check the display contents while the electroluminescent panel 6 is off, the characters on display 2 may be indiscernible or difficult to read. In this case, the operator must restore the panel 6 to its original brightness. No special key is needed to control the data processing device. Any key can be used. This frees the operator from complex follow-up key operations. While the electroluminescent panel 6 remains off, however, the operator cannot easily identify what kind of key-input the controller system is looking for. It is therefore also possible for the operator to void the first key input while the electroluminescent panel 6 remains off and then restore the brightness of the electroluminescent panel 6 to the original level. This allows the operator to correctly identify the contents of the liquid crystal display 2 before normal key-input operation. FIG. 4 represents the timing for execution of these operations. A pulse "a1" is input by the first strike of a key while the electroluminescent panel 6 is off, which allows the operator to execute the display process described above during period "A." This lasts until the next "a2" pulse is input by a second strike of a key. The operator then enters data normally through the keyboard by applying pulses "a3", "a4", etc. This procedure prevents the operator from incorrectly operating keys when the display contents cannot be seen. In the preferred embodiment described above, system operations have been explained based on the assumption that neither key-input, data-output onto the display screen, nor floppy disc accessing operations are executed while the electroluminescent panel 6 remains inoperative. However, the spirit and scope of the present invention are not always limitative of these three conditions. In other words, the operator's key operation may be taken into account as a trigger. For example, by connecting a speech recognition unit to the data processing device related to the present invention, the operator can identify whether the data processing device is operative or not by confirming receipt of signals from the voice recognition unit. The period of time needed to identify the inoperative state of the electroluminescent panel 6 can be determined properly by the operator in accordance with the conditions of use. As is clear from the foregoing description, the data processing device which is provided with a liquid crystal display unit and an electroluminescent backlighting panel reflecting the preferred embodiment of the present invention features means for measuring the inoperative period of the electroluminescent panel and control means for turning off the electroluminescent panel in response to output from the measuring means. This allows the controller system to shut off automatically the voltage being fed to the electroluminescent panel after a specific period of time passes, even if the operator leaves the data processing device inoperative by failing to turn off the processor unit power. This effectively limits waste of the electroluminescent panel and ensures a longer service life.

In addition, another preferred embodiment of the present invention provides a novel data processing device which is provided with a liquid crystal display unit having an electroluminescent backlighting panel, and which features the provision of means for measuring the inoperative period of the electroluminescent panel, control means for turning off said electroluminescent panel, and means for informing the operator that the extinguishment of the electroluminescent panel light is due to operation of the control means. This allows the operator to identify correctly whether or not the extinguishment of the electroluminescent panel light has been caused by the operation of the controller system itself, thus preventing the operator from misunderstanding the reason the light extinguished. While only certain embodiments of the present invention have been described, it will be apparent to those skilled in the art that various changes and modifications may be made therein without departing from the spirit and scope of the present invention as claimed.

What is claimed is:

1. A data processing machine comprising:
    a liquid crystal display panel for displaying data;
    means for selectively inputting data into said data processing machine, said data being displayed on said liquid crystal display panel;
    means for accessing data from an external memory, said data being displayed on said liquid crystal display panel;
    means for backlighting said liquid crystal display panel, said means for backlighting being in one of an operative state and an inoperative state, said inoperative state being a period in which said liquid crystal display panel fails to be illuminated by said means for backlighting, said operative state being a period in which said liquid crystal display panel is illuminated;
    means for counting a time period between successive inputs by said means for inputting, between successive displays on said liquid crystal display and between successive accesses of data by said means for accessing to thereby generate a signal when a length of time period corresponds to a selected period of time;
    control means for turning off said means for backlighting in response to said signal generated by said means for counting, said control means further turning said means for backlighting back on in response to operation of at least one of said means for selectively inputting data and said means for accessing data whereby power consumption of said data processing machine is reduced in response to turning off of said means for backlighting during said inoperative state;
    control register means for storing data related to brightness of said means for backlighting before said control means turns off the means for backlighting, a time period during which said means for backlighting is illuminated and a time counted by said means for counting, said control register means being operative associated with said control means to return said means for backlighting to the same brightness when said control means turns said means for backlighting back on, said control means further varying luminosity of said means for backlighting between at least two different states, said means for backlighting illumianting said liquid crystal display by a first luminosity in a first state and a second luminosity in a second state, said first luminosity being brighter than said second luminosity whereby said means for backlighting may be in a first state, a second state, or turned off by said control means; and
    means for indicating that said means for backlighting has been turned off by said control means, said means for indicating being located separate from said liquid crystal display.

2. The data processing machine as recited in claim 1, wherein said means for selectively inputting comprises at least one of a keyboard and a speech recognition unit, and said external memory comprises a floppy disc.

3. The data processing machine as recited in claim 1, wherein said means for backlighting comprises an electroluminescent panel.

4. The data processing machine as recited in claim 1, wherein said means for inputting comprises a keyboard with a plurality of keys, said control means being responsive to a first operation of any one of said keys after said means for backlighting has been turned off in order to turn said means for backlighting back one, the first operation of said keys being invalid whereby said means for inputting fails to input data associated with the first operated key into said data processing machine when said means for backlighting is being turned back on.

5. A data processing machine comprising:
    a liquid crystal display panel for displaying data;
    means for selectively inputting data into said data processing machine, said data being displayed on said liquid crystal display panel;
    means for backlighting said liquid crystal display panel, sai means for backlighting being in one of an operative state and an inoperative state, said inoperative state being a period in which said liquid crystal display panel fails to be illuminated by said means for backlighting, said operative state being a period in which said liquid crystal display panel is illuminated;
    means for counting a time period between successive inputs by said means for inputting and successive displays on said liquid crystal display and for generating a signal when a length of said time period corresponds to a selected period of time;
    control means for turning off said means for backlighting in response to said signal generated by said means for counting, said control means further turning said means for backlighting back on in response to operation of said means for selectively inputting data whereby power consumption of said data processing machine is reduced in response to turning off of said means for backlighting during said inoperative state, said control means further varies luminosity of said means for backlighting between at least two different states, said means for backlighting illuminating said liquid crystal display by a first luminosity in a first state and a second luminosity in a second state, said first luminosity being brighter than said second luminosity whereby said means for backlighting may be in a first state, a second state, or turned off by said control means; and control register means for storing data related to brightness of said means for backlighting before said control means turns off the means for backlighting, a time period during which said means for backlighting is illuminated and a time counted by said means for counting, said control register means being operatively associated with said control means to return said means for backlighting to the same brightness when said control means turns said means for backlighting back on.

6. The data processing machine as recited in claim 5, further comprising means for indicating that said means for backlighting has been turned off by said control means, said means for indicating being located separate from said liquid crystal display.

7. The data processing machine as recited in claim 5, wherein said means for selectively inputting comprises at least one of a keyboard and a speech recognition unit.

8. The data processing machine as recited in claim 5, wherein said means for backlighting comprises an electroluminescent panel.

9. The data processing machine as recited in claim 5, wherein said means for inputting comprises a keyboard with a plurality of keys, said control means being responsive to a first operation of any one of said keys after said means for backlighting has been turned off in order to turn said means for backlighting back on, the first operation of said keys being invalid whereby said means for inputting fails to input data associated with the first operated key into said data processing machine when said means for backlighting is being turned back on.

10. A personal computer comprising:
a central processing unit (CPU), a timer, a liquid crystal display, a backlight positioned on a backside of said liquid crystal display, backlight driver means, external memory means, and a keyboard with a plurality of keys;

said CPU counting a non-access period in response to a predetermined interruption output from said timer and outputting a turn-off code for said backlight when a predetermined time period has been counted;

said CPU further resetting a counter of said timer in response to at least one of requests of key input processing, information output processing for said liquid crystal display and access processing for said external memory means;

said backlight driver means including control means for varying luminosity of said backlight and for turning off said backlight in response to the turn-off code, said control means further varying luminosity of said backlight between at least two different states, said backlight illuminating said liquid crystal display by a first luminosity in a first state and a second luminosity in a second state, said first luminosity being brighter than said second luminosity whereby said backlight may be in a first state, a second state, or turned off by said control means; and control register means for storing data related to brightness of said means for backlighting before said control means turns off the means for backlighting, a time period during which said means for backlighting is illuminated and a time counted by said means for counting, said control register means being operatively associated with said control means to return said means for backlighting to the same brightness when said control means turns said means for backlighting back on of the requests of the key input processing, the information output processing and the access processing.

11. The personal computer as recited in claim 10, further comprising an indicator for indicating a turned-off state of said backlight, said indicator being turned on in response to said backlight being in the turned-off state.

* * * * *